US00RE36709E

United States Patent [19]

Matsumoto et al.

[11] E Patent Number: Re. 36,709

[45] Reissued Date of Patent: May 23, 2000

[54] PHOTOMAGNETIC DISC RECORD/ REPRODUCTION APPARATUS INCLUDING IMPROVED MAGNETIC HEAD LIFTING MECHANISM

[75] Inventors: Motoyoshi Matsumoto, Fussa; Tomomi Matsumura, Hino, both of Japan

[73] Assignee: Kabushiki Kaisha Kenwood, Tokyo, Japan

[21] Appl. No.: 09/044,132

[22] Filed: Mar. 19, 1998

Related U.S. Patent Documents

Reissue of:

[64] Patent No.: 5,500,838
Issued: Mar. 19, 1996
Appl. No.: 08/160,910
Filed: Dec. 3, 1993

[30] Foreign Application Priority Data

Dec. 10, 1992 [JP] Japan ..... 4-352621
Dec. 10, 1992 [JP] Japan ..... 4-352622

[51] Int. Cl.[7] ..... G11B 11/00; G11B 33/02

[52] U.S. Cl. ..... 369/13; 369/75.2

[58] Field of Search ..... 369/13, 75.2, 15, 369/14, 126, 77.2, 75.1, 77.1, 78, 79; 360/114, 59, 104–109; 365/122

[56] References Cited

U.S. PATENT DOCUMENTS 5,202,861 4/1993 Yoshida ..... 369/13
5,224,079 6/1993 Inoue ..... 369/13
5,226,024 7/1993 Mukawa ..... 369/13
5,384,757 1/1995 Ohmori et al. ..... 369/13
5,500,838 3/1996 Matsumoto et al. ..... 369/13
5,557,589 9/1996 Mukawa et al. ..... 369/13
5,604,719 2/1997 Kakimoto et al. ..... 369/13
5,625,612 4/1997 Tozune et al. ..... 369/77.2
5,805,552 9/1998 Tozune et al. ..... 369/275.2

FOREIGN PATENT DOCUMENTS 63-71962 4/1988 Japan .
2-267788 11/1990 Japan .
3-80449 4/1991 Japan .
4-21946 1/1992 Japan .
4-152236 5/1992 Japan .
4-330657 11/1992 Japan .
5-128616 5/1993 Japan .
5-325296 12/1993 Japan .
5-325375 12/1993 Japan .
5-342737 12/1993 Japan .
6-76513 3/1994 Japan .
6-150436 5/1994 Japan .
6-162649 6/1994 Japan .
2788586 6/1998 Japan .

*Primary Examiner*—Ali Neyzari
*Attorney, Agent, or Firm*—Eric J. Robinson; Nixon Peabody LLP

[57] ABSTRACT

A holder holds a mini-disc cartridge and mounts the disc on a turntable. An optical pickup transport holding an optical pickup for applying a laser spot to a signal record track of the disc is movably supported by a guide rod. A magnetic head contacts the disc and applies a magnetic field to the back surface of the disc where the laser spot is applied. A switch judges whether the data record to the disc is to be permitted. The magnetic head is pushed against the disc only when the mounted disc is permitted to record data and the data record is to be performed.

14 Claims, 10 Drawing Sheets

PHOTOMAGNETIC DISC RECORD/ REPRODUCTION APPARATUS INCLUDING IMPROVED MAGNETIC HEAD LIFTING MECHANISM

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a photomagnetic disc record/reproduction apparatus using a recording medium housed within a cartridge, and more particularly to a cartridge loading mechanism and a magnetic head lifting mechanism used by such a photomagnetic disc record/reproduction apparatus.

2. Related Background Art

A mini-disc (MD) known as a rewritable photomagnetic disc includes a pre-mastered mini-disc and a recordable mini-disc. A pre-mastered mini-disc is a reproduction-only disc in which information is recorded in the form of pits and is reproduced from a reflected laser spot supplied by an optical pickup.

A recordable mini-disc is formed with a pit information record area at the central area of the disc and a recordable area at the outer area. The recordable area includes a user's TOC (Table of Contents) area (UTOC) and a program area. The recordable area has no pit, but a groove is engraved for the guidance to tracks. Information is recorded in the recordable area along the groove.

The groove sways like wobble. The rotation of the disc is controlled by a signal having an average frequency of 22.05 kHz and generated based on the wobble. Absolute addresses relative to the record start position are FM-modulated and recorded in the wobble.

Data record is achieved by magnetizing a magnetic film. Namely, the magnetic film is heated to a Curie point or higher by a laser spot while applying a magnetic field which reverses its polarity depending upon an input signal, and thereafter cooled. The signal is therefore recorded in the magnetic film as a change in the magnetization direction. The rotation direction of a polarization plane of a reflected laser spot changes with the magnetization direction of the magnetic film. Information is therefore reproduced by detecting a change in the polarization plane of a reflected laser spot.

A hole is formed in a cartridge accommodating a pre-mastered optical disc at a predetermined area for the inhibition of data record. A similar hole is also formed in a cartridge accommodating a recordable photomagnetic disc, and a shutter is provided to cover the hole. If the data record of a recordable photomagnetic disc is to be inhibited, the shutter is opened, whereas if the data record is permitted, the shutter is closed.

With a conventional photomagnetic disc record/reproduction apparatus, a hole indicating an inhibition of data record is detected to judge whether the data record is inhibited or not. When a photomagnetic disc allowed to record data is loaded, the magnetic head is always made to contact the disc.

With such a conventional photomagnetic disc record/reproduction apparatus, since the magnetic head is maintained always in contact with the disc permitted the data record even during the reproduction of data, the abrasion amount of the disc and magnetic head becomes great, shortening the life time of these components.

Furthermore, since there is a contact resistance between the disc and magnetic head, the load on the spindle motor increases resulting in a large power consumption of a battery if the apparatus is powered from the battery.

The present invention has been made in consideration of the above circumstances. It is an object of the present invention to provide a photomagnetic disc record/reproduction apparatus capable of elongating the life time of a magnetic head and disc, and the life time a battery when the apparatus is powered from the battery.

A mini-disc is accommodated within a cartridge. For the data record/reproduction, the cartridge is loaded to a record/reproduction unit. The record/reproduction unit is constructed of a turntable for rotating a disc, an optical pickup, a magnetic head, and the like. These components are mounted on a floating chassis in order to absorb external vibrations.

A recess is formed in a cartridge accommodating a pre-mastered mini-disc at a predetermined area. A pre-mastered mini-disc can be discriminated from a recordable mini-disc by detecting this recess. When a recordable mini-disc is loaded, the magnetic head is made to contact the disc, whereas when a pre-mastered mini-disc is loaded, the magnetic head is made not to contact the disc.

Of conventional mini-disc record/reproduction apparatuses for the record/reproduction of data of such a mini-disc, there is an apparatus of the type that a member for clamping a cartridge to a positioning member is mounted on a chassis supported by a main frame chassis of a loading mechanism. With such an apparatus, the record/reproduction unit cannot be physically separated completely from the main frame chassis during the data record/reproduction so that resistance against vibrations is adversely affected.

With an apparatus having a clamp member mounted on a holder for holding a cartridge, the friction when a cartridge is pushed into the holder becomes large, posing the problems of a large loading force and abrasion or damages of a cartridge.

Of conventional apparatuses having a lifting mechanism for lifting or lowering a magnetic head which follows the motion of an optical head, there are an apparatus of the type that the magnetic head lifting mechanism is not mounted on an optical pickup transport, and an apparatus of the type that the mechanism is mounted on the transport. In the former case, there occurs a contact or slide of a component during the motion of the optical pickup, generating vibrations, In the latter case, a drive source different from that of the loading mechanism is required for the optical pickup transport, increasing the necessary mount space and manufacturing cost.

The present invention has been made in consideration of the above circumstances. It is an object of the present invention to provide a photomagnetic disc record/reproduction apparatus capable of providing a good vibration-proof by physically separating a record/reproduction unit completely from a main frame chassis, eliminating a contact or slide of a component mounted on a magnetic head lifting mechanism during the motion of an optical pickup, driving the magnetic head lifting mechanism by a drive source of a loading mechanism, and realizing a reduced mount space and manufacturing cost.

SUMMARY OF THE INVENTION

According to one aspect of the present invention, there is provided a photomagnetic disc record/reproduction apparatus of the type having: a holder for holding a photomagnetic disc accommodated in a cartridge and mounting the disc on a turntable; an optical pickup for applying a laser spot to a signal record track of the disc; a magnetic head for applying a magnetic head to the back surface of the disc where the laser spot is applied; a magnetic head drive mechanism for making the magnetic head contact the disc or separate from the disc; and a switch for judging whether the mounted disc is allowed to record data, wherein the magnetic disc is made to contact the disc only when the mounted disc is allowed to record data and the data record is to be performed.

In the photomagnetic disc record/reproduction apparatus according, there is provided a cam commonly used by a holder drive mechanism and the magnetic head drive mechanism, the cam being controlled to take three positions to provide a state where the disc is spaced apart from the turntable, a state where the disc is mounted on the turntable and the magnetic head is spaced apart from the disc, and a state where the disc is mounted on the turntable and the magnetic head is made in contact with the disc.

According to the photomagnetic disc record/reproduction apparatus of the invention, the magnetic head is positioned spaced apart from the photomagnetic disc permitted the data record, during the data reproduction, thereby elongating the life time of the magnetic head and disc.

The life time of a battery is also elongated when the apparatus is powered from the battery. Generally, the number of reproductions is greater than the number of records to a photomagnetic disc permitted the data record. Therefore, the effects of no abrasion of the magnetic head and disc are tremendous.

The cam is used for the position control of both the holder and magnetic head of a photomagnetic disc record/reproduction apparatus. Therefore, the driving mechanism can be simplified and the manufacturing cost can be reduced.

According to another aspect of the present invention, there is provided a photomagnetic disc record/reproduction apparatus of the type that an optical pickup for applying a laser spot to a signal record track of a photomagnetic disc, and a spindle motor and a turn table for rotating the magnetic disc, are supported by a floating chassis, and a cartridge accommodating the photomagnetic disc is mounted on the turntable at a predetermined position by pushing the cartridge into a holder using a loading tray and by lowering the holder, wherein a pressure arm rotatively supported by the floating chassis and biased by a spring is adapted to be coupled to the holder to make the holder to be pushed against the floating chassis, and a plate spring attached to the pressure arm at the position remoter from the rotation center of the pressure arm than the coupling point between the pressure arm and the holder is adapted to make the cartridge to be pushed against a positioning member mounted on the floating chassis.

According to the photomagnetic disc record/reproduction apparatus of the invention, the pressure arm rotates as the holder lowers. In this case, the rotation arm of the plate spring for clamping the cartridge is greater than the rotation arm of the coupling point between the pressure arm and the holder. As a result, the plate spring can apply a sufficient clamp pressure to the cartridge even if the contact force between the plate spring and cartridge is made very small or zero when pushing the cartridge into the holder.

Furthermore, the pressure arm attaching the plate spring is supported by the floating chassis so that the record/reproduction unit can be physically separated completely from the main frame chassis during the data record/reproduction.

During the cartridge unloading, the magnetic head arm supported by the optical pickup transport is lifted by the holder. During the cartridge loading, the magnetic head arm rotates following the downward movement of the holder, and positions apart from the holder when it is stopped by the discrimination cam.

The discrimination cam supported by the optical pickup transport contacts the discrimination lever supported by the holder at the holder raised position, but it becomes spaced apart from the discrimination lever when the holder lowers during the cartridge loading.

In this manner, the components supported by the optical pickup transport can be physically separated from other components during the data record/reproduction. Accordingly, there is no contact or slide of a component during the motion of the optical pickup, eliminating the adverse effects of vibrations or the like.

During the cartridge unloading operation, the holder rises and the optical pickup moves to the home position. In this case, the surface of the discrimination lever facing the discrimination cam is made so smooth that the discrimination cam rotates against the force of the spring, retracting from the discrimination lever when the discrimination lever couples to the discrimination cam. Accordingly, the unloading operation is not hindered. The optical pickup wherever it is placed at the unloading operation, can be moved at once thereby providing a quick unloading operation.

DETAILED DESCRIPTION OF THE PREFERRED EMBODIMENTS

A photomagnetic disc record/reproduction apparatus according to a first embodiment of the invention will be described with reference to the accompanying drawings.

Figure 1:
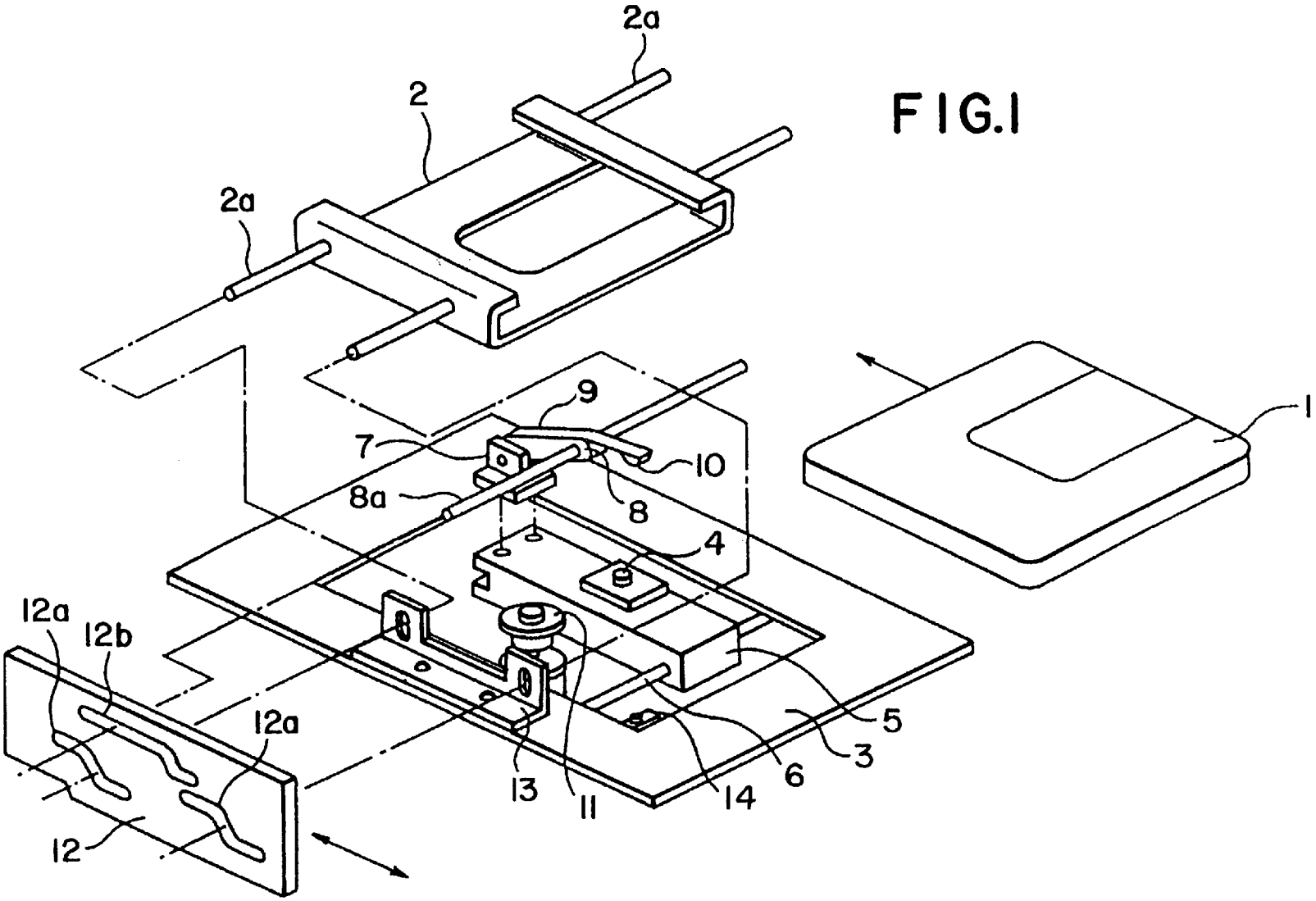
FIG. 1 is a broken perspective view of a photomagnetic disc record/reproduction apparatus according to a first embodiment of the present invention.

FIG. 1 is a broken perspective view of the photomagnetic disc record/reproduction apparatus according to the first embodiment of the invention. In FIG. 1, reference numeral 1 represents a mini-disc accommodated in a photomagnetic disc cartridge. A cartridge accommodating a recordable photomagnetic disc is provided with a shutter riding on both the front and back surfaces of the cartridge, and a shutter covering a hole formed at a corner of the disc and indicating a record disabled state. A cartridge accommodating a pre-mastered photomagnetic disc is provided with a shutter riding on the back surface of the cartridge, and a hole formed at a corner of the disc and indicating a record disabled state.

Reference numeral 2 represents a holder for holding the photomagnetic disc cartridge 1 and lifting or lowering it. Rods 2a, 2a, . . . mounted on both the sides of the holder 2 are inserted into vertically elongated holes of guide plates 13 fixed to a chassis 3 and into cam grooves 12a, 12a, . . . of sliders 12. The guide plates 13 and sliders 12 are provided on the right and left sides of the holder 2. However, in FIG. 1, the guide plate 13 and slider 12 only on the left side are shown. The slider 12 is moved back and forth by a drive mechanism (not shown) to lift or lower the holder 2.

A pickup support 5 for supporting an optical pickup 4 is guided by a guide rod 6 and moved to the right and left by a pickup feed motor (not shown). A bearing 7 is fixedly mounted on the pickup support 5 to pivotally support an arm 8. A magnetic head 10 is mounted on the tip of a plate spring 9 which is bonded to the arm 8.

A rod 8a mounted on the arm 8 is inserted into cam grooves 12b of the sliders 12. A turntable 11 is coaxially and fixedly mounted on the rotary shaft of a spindle motor fixed to the chassis 3. A switch 14 is fixed to the chassis 3 which switch judges whether the photomagnetic disc is allowed to record data.

In loading the disc, the photomagnetic disc cartridge 1 is pushed into the holder 2 by using a tray (not shown), the holder being set at the raised or lifted position. At this time, the shutter of the photomagnetic disc cartridge 1 is opened.

Figure 2A:
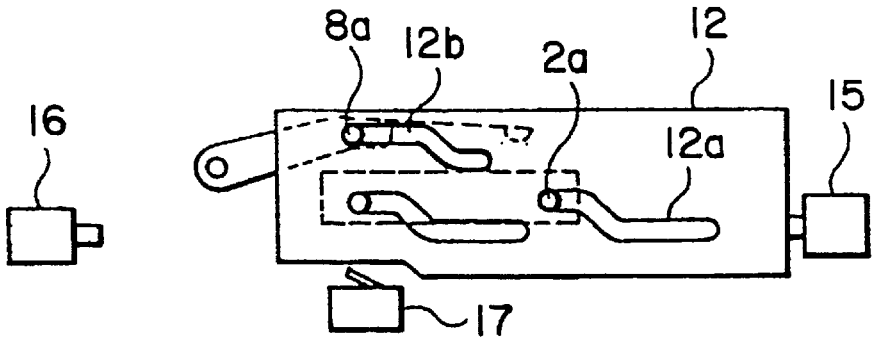
FIGS. 2A to 2C are side views explaining the operation of the photomagnetic disc record/reproduction apparatus of the first embodiment.

The holder 2 is at the lifted position where the slider 12 is at the forward position and has actuated a switch 15 as shown in FIG. 2A. Switches 15, 16, and 17 not shown in FIG. 1 are fixedly mounted on the chassis 3.

After the photomagnetic disc cartridge 1 was pushed into the holder 2, the slide 12 is moved to the retracted or backward position and the photomagnetic disc cartridge 1 lowers along with the holder 2. As a result, the inner circumferential area of the disc is attracted by the magnetic force generated by the turntable 11, and the disc is rotated by the turntable 11. At this time, the switch 14 judges from the presence/absence of the hole whether data is allowed to be recorded.

Figure 2B:
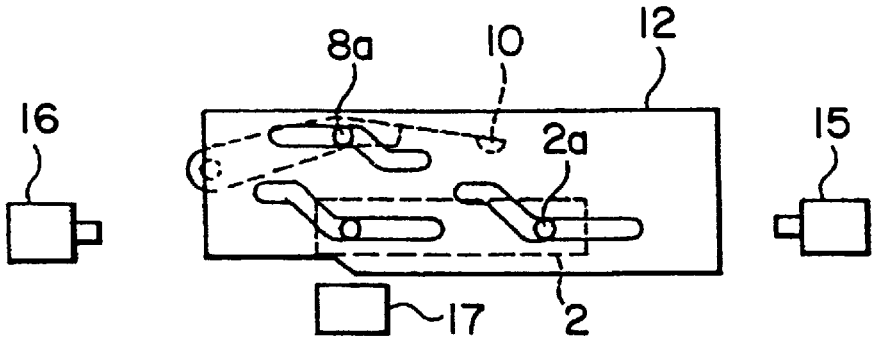

FIG. 2B shows the state where the holder 2 is at the lowered position. The lowered holder 2 is detected by the switch 17. At this state, the magnetic head 10 is not in contact with the disc, permitting only the data reproduction.

Figure 2C:
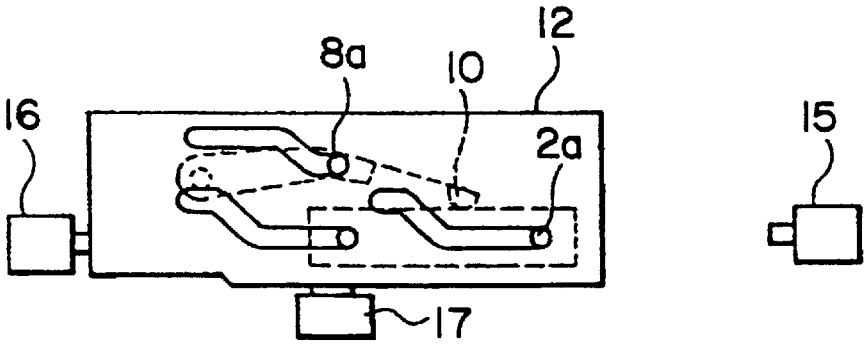

If the data record to the loaded disc was permitted and is to be performed, the slider 12 is moved further backward from the position shown in FIG. 2B so that the switch 16 is activated as shown in FIG. 2C to stop the slider 12 and press the magnetic head 10 against the disc. Under this condition, a magnetic field modulated by a record signal is applied from the magnetic head 10 to the magnetic film of the disc heated by the laser spot from the optical pickup 4, to thereby record information.

As described above, the magnetic head 10 is pressed against the disc only when information is recorded on the disc. Accordingly, the abrasion of the magnetic head and a disc as well as the power consumption is less as compared to the case where the magnetic head 10 is pressed against a disc even during the reproduction.

Figure 3:
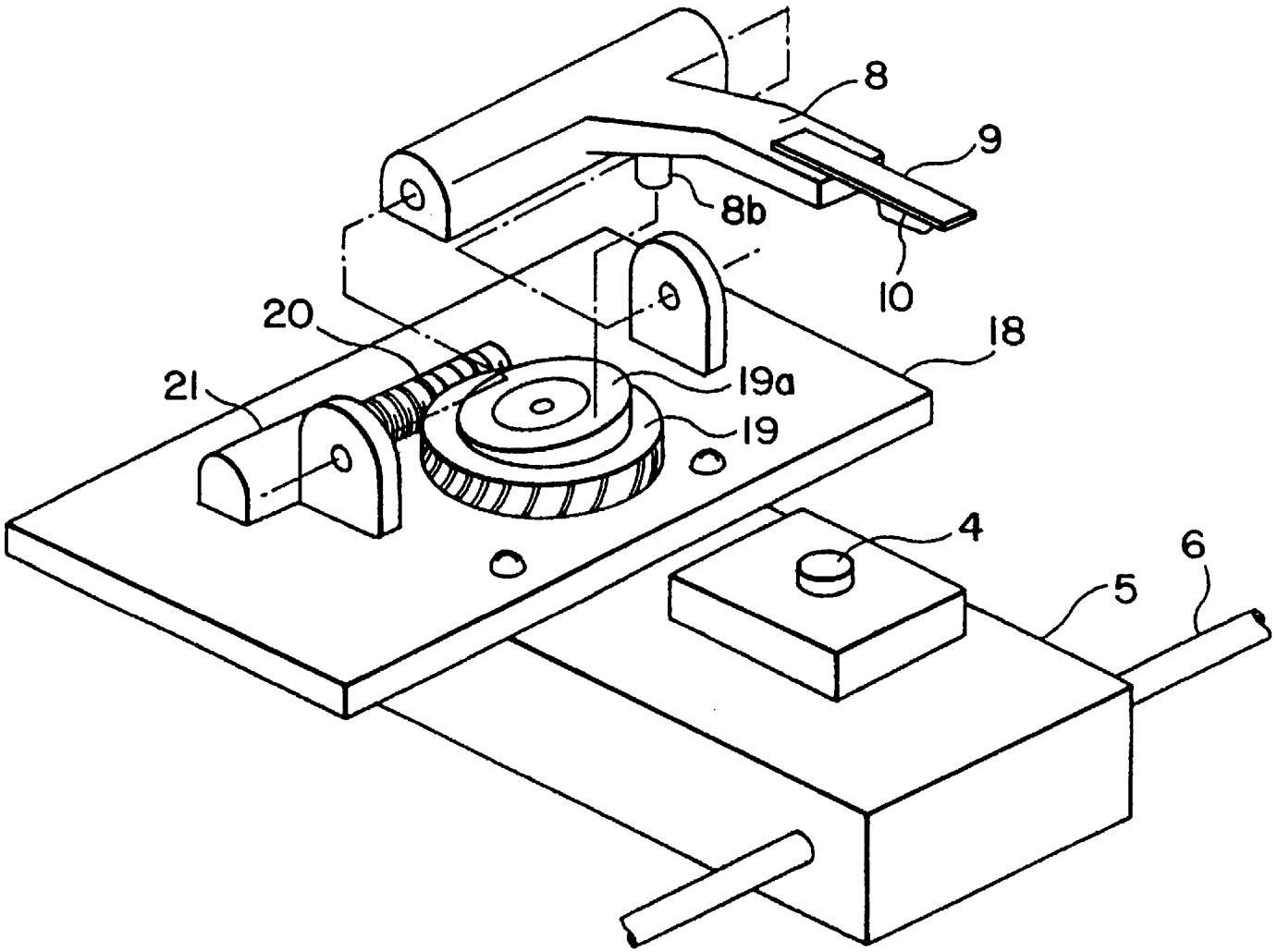
FIG. 3 is a broken perspective view of a photomagnetic disc record/reproduction apparatus according to a second embodiment of the present invention.

FIG. 3 is a broken perspective view showing part of a photomagnetic disc record/reproduction apparatus according to a second embodiment of the invention. In this embodiment, the magnetic head 10 is supported by a magnetic head mount 18 fixed to a pickup support 5 to lift and lower the magnetic head 10.

Specifically, an arm 8 is pivotally supported by the magnetic head mount 18 and biased in the clockwise direction by a spring (not shown). A worm wheel 19 is rotatively supported by the magnetic head mount 19, and a cam surface integrally formed with the worm wheel 19 contacts a protrusion 8b formed on the arm 8.

The worm wheel 19 meshes with a worm 20 fixed to the rotary shaft of a motor 21, and is rotated by a motor 21. As the motor 21 rotates, the magnetic head 10 is moved upward and downward. The lifted position and lowered position of the magnetic head 10 are detected by switches (not shown). The magnetic head 10 is pressed against the disc at the lowered position.

A holder like that shown in FIG. 1 is raised or lowered by a slider. In this embodiment, the slider raises or lowers only the holder. Namely, the cam groove 12b of the holder 12 shown in FIG. 1 is not provided. The other structures are similar to the first embodiment shown in FIG. 1. In the second embodiment, although the magnetic head and holder are driven by different drive mechanisms, the magnetic disc 10 is pressed against a disc only during the data record, similar to the first embodiment and with the same advantageous effects.

Figure 4:
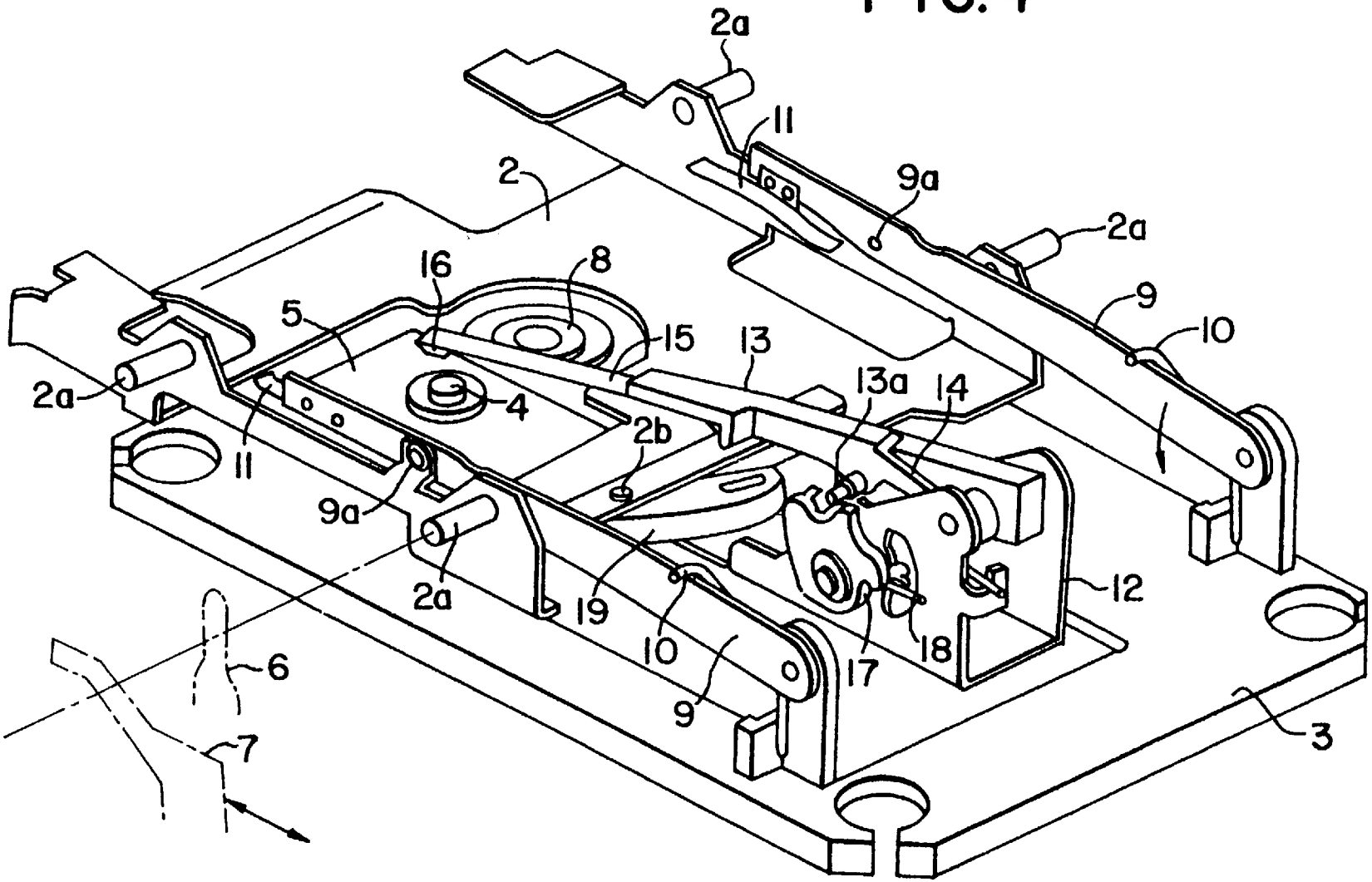
FIG. 4 is a perspective view showing the main part of a photomagnetic disc record/reproduction apparatus according to a third embodiment of the present invention.

A mini-disc record/reproduction apparatus according to a third embodiment of the invention will be described next. FIG. 4 is a perspective view showing the main part of the mini-disc record/reproduction apparatus of the third embodiment. In FIG. 4, reference numeral 2 represents a holder for holding a mini-disc cartridge and lifting or lowering it. Rods 2a, 2a, . . . mounted on both the sides of the holder 2 are inserted into vertically elongated holes 6 of guide plates 13 fixed to a main frame chassis and into cam grooves 7 of sliders. The vertically elongated hole 6 and cam groove 7 only for one rod 2a are shown in FIG. 4, and the other holes and grooves are omitted. The sliders are driven back and forth by a drive mechanism (not shown) to lift or lower the holder 2.

As a mini-disc cartridge 1 which is pushed into the holder 2 by using a loading tray 20, there are a cartridge accommodating a recordable mini-disc and a cartridge accommodating a pre-mastered mini-disc. A cartridge accommodating a recordable mini-disc is provided with a shutter riding on both the front and back surfaces of the cartridge. A cartridge accommodating a pre-mastered mini-disc is provided with a shutter riding on the back surface of the cartridge, and a recess 1a formed in the cartridge back wall.

An optical pickup transport 5 for supporting an optical pickup 4 is guided by a guide rod fixed to a floating chassis 3, and transported to the right and left by a pickup transport motor (not shown).

The floating chassis 3 is supported by the main frame chassis by means of dampers (not shown) fitted in holes formed in the floating chassis 3 at the four corners. Pressure arms 9,9 are pivotally supported by the floating chassis 3 and biased in the counter-clockwise direction by torsion coil springs 10, 10.

The pressure arms 9, 9 are coupled to the holder 2 via shafts 9a, 9a. Therefore, as the holder 2 lowers along with the cam grooves 7, the holder 2 is pressed against the floating chassis 3. Under this condition, the rods 2a detach from the upper walls of the vertically elongated holes 6 and cam grooves 7. Plate springs 11, 11 are fixed to the distal ends of the pressure arms 9, 9 to press the cartridge against a positioning member (not shown).

A turntable 8 is coaxially and fixedly mounted on the rotary shaft of a spindle motor fixed to the floating chassis 3. A bracket 12 is fixed to the optical pickup transport 5, and rotatively supports a magnetic head arm 13 and a discrimination cam 17 which are biased in the counter-clockwise direction by torsion coil springs 14 and 18.

Figure 5:
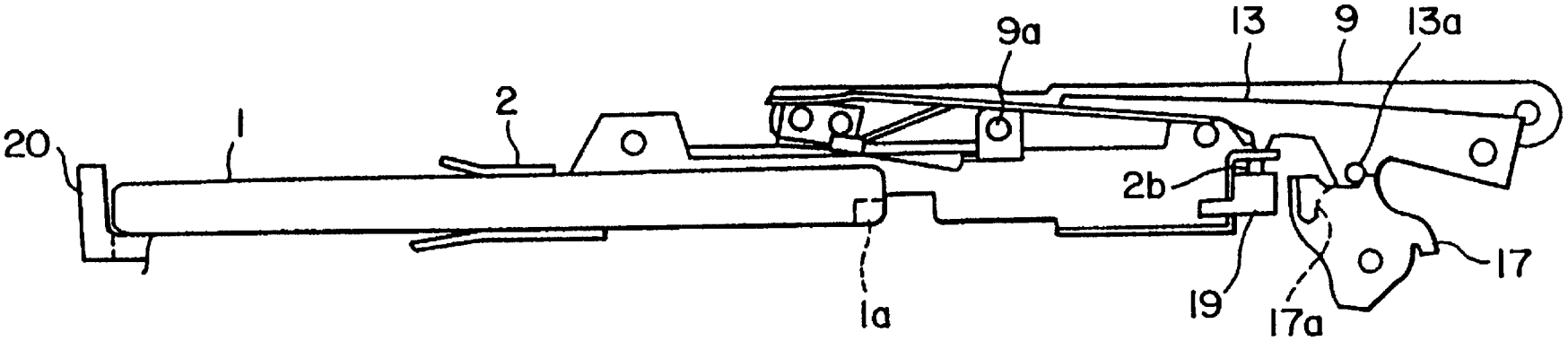
FIG. 5 is a side view explaining the operation of the mini-disc record/reproduction apparatus of the third embodiment.

A magnetic head 16 is mounted on the tip of a plate spring 15 fixed to the magnetic head arm 13. A discrimination lever 19 is rotatively supported by the holder 2 by means of a shaft 2b, and biased in the counter-clockwise direction by a torsion coil spring (not shown). The operation of the third embodiment will be described with reference to FIGS. 5, 6A, 6B, 7A, 7B, 8, 9, and 10. FIG. 5 shows that state where the cartridge 1 is being pushed into the holder 2. The holder 2 is lifted at this state, and the pressure arms 9 are rotated in the counter-clockwise direction. The magnetic head arm 13 is raised by the holder 2 and also rotated in the counter-clockwise direction.

The discrimination lever 19 will not rotate in the direction toward the discrimination cam 17, but remains spaced apart from it. The discrimination cam 17 rotates in the counter-clockwise direction until it abuts a projection 13a of the magnetic head arm 13.

Figure 6A:
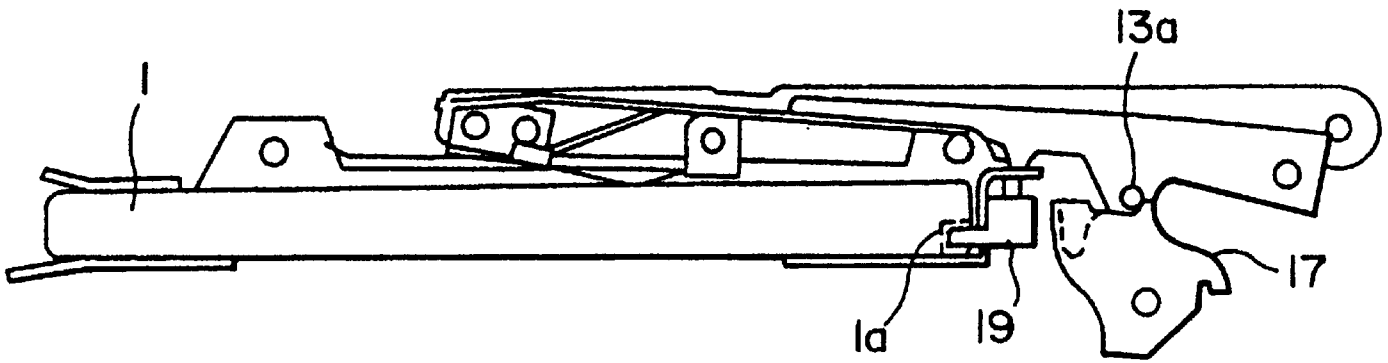
FIG. 6A is a side view explaining the operation of the mini-disc record/reproduction apparatus of the third embodiment.
Figure 6B:
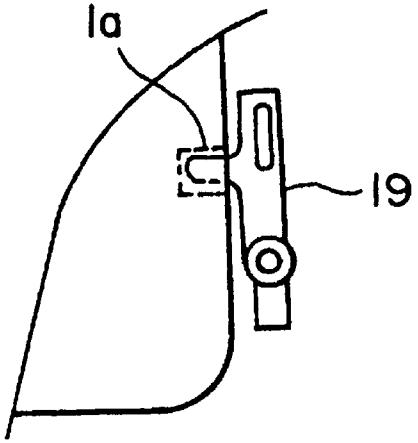
FIG. 6B is a side view explaining the operation the mini-disc record/reproduction apparatus of the third embodiment.

When the cartridge 1 is pushed into the holder 2, the shutter of the cartridge 1 is opened. FIGS. 6A and 6B show the state where a cartridge accommodating a pre-mastered min-disc is pushed into the holder 2. In this case, a projection of the discrimination lever 19 enters the recess 1a of the cartridge 1 so that the discrimination lever 19 will not rotate and hence the discrimination cam 17 will not rotate.

Figure 8:
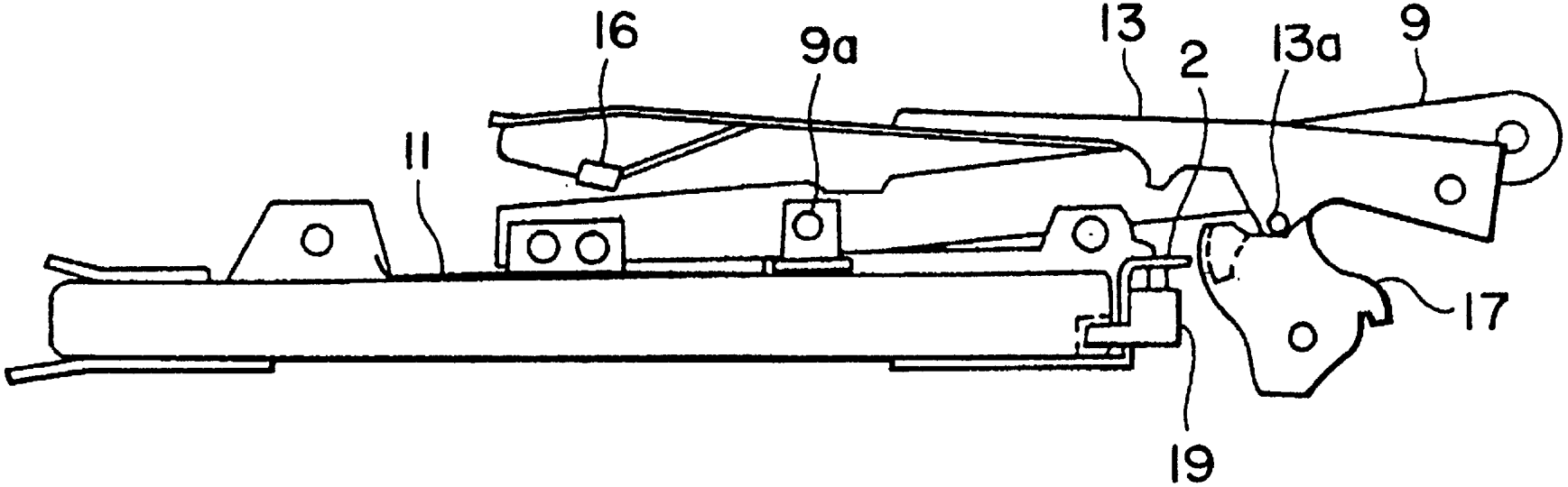
FIG. 8 is a side view explaining the operation of the mini-disc record/reproduction apparatus of the third embodiment.

FIG. 8 shows the state where the holder 2 further lowers from the state shown in FIGS. 6A and 6B. The plate spring 11 lowers by a distance greater than the motion span of the holder 2 to press the cartridge 1 against the positioning member, so that the inner circumferential area of the disc is attracted by the magnetic force generated by the turntable 8 and the disc is rotated by the turntable 8.

At this time, the projection 13a of the magnetic head arm 13 abuts the discrimination cam 17, preventing the magnetic head arm 13 from being rotated and maintaining the magnetic head 16 to be spaced apart from the mini-disc. In addition, the holder 2 is separated from the magnetic head arm 13 and the discrimination lever 19 is separated from the discrimination cam 17. In this way, the components supported by the magnetic pickup transport 5 are physically separated from the other components, providing a smooth transport of the optical pickup 4 during the data reproduction operation.

Figure 7A:
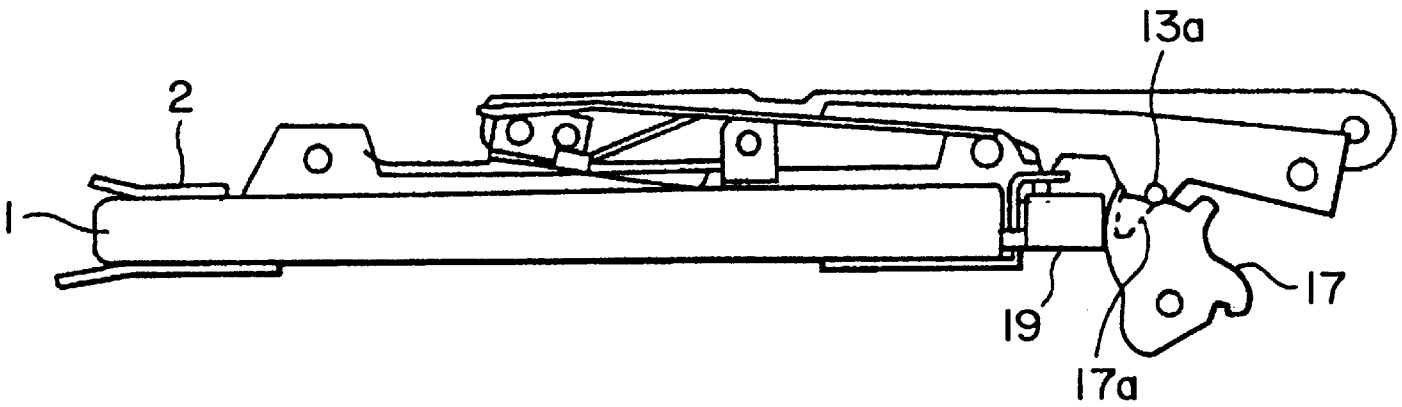
FIG. 7A is a side view explaining the operation of the mini-disc record/reproduction apparatus of the third embodiment.
Figure 7B:
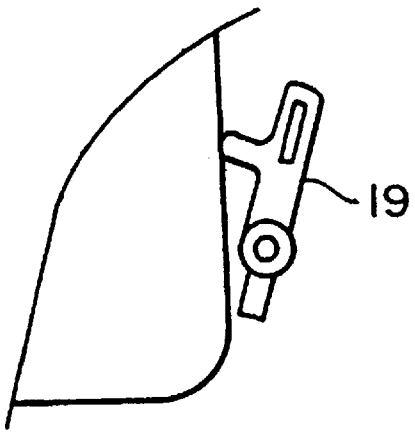
FIG. 7B is a side view explaining the operation the mini-disc record/reproduction apparatus of the third embodiment.

FIGS. 7A and 7B show the state wherein a cartridge 1 accommodating a recordable mini-disc is being pushed into the holder 2. In this case, the projection of the discrimination lever 19 is pushed by the cartridge 1 so that the discrimination lever 19 rotates. The discrimination cam 17 is pushed by the discrimination lever 19 so that the cam 17 rotates in the counter-clockwise direction.

Figure 9:
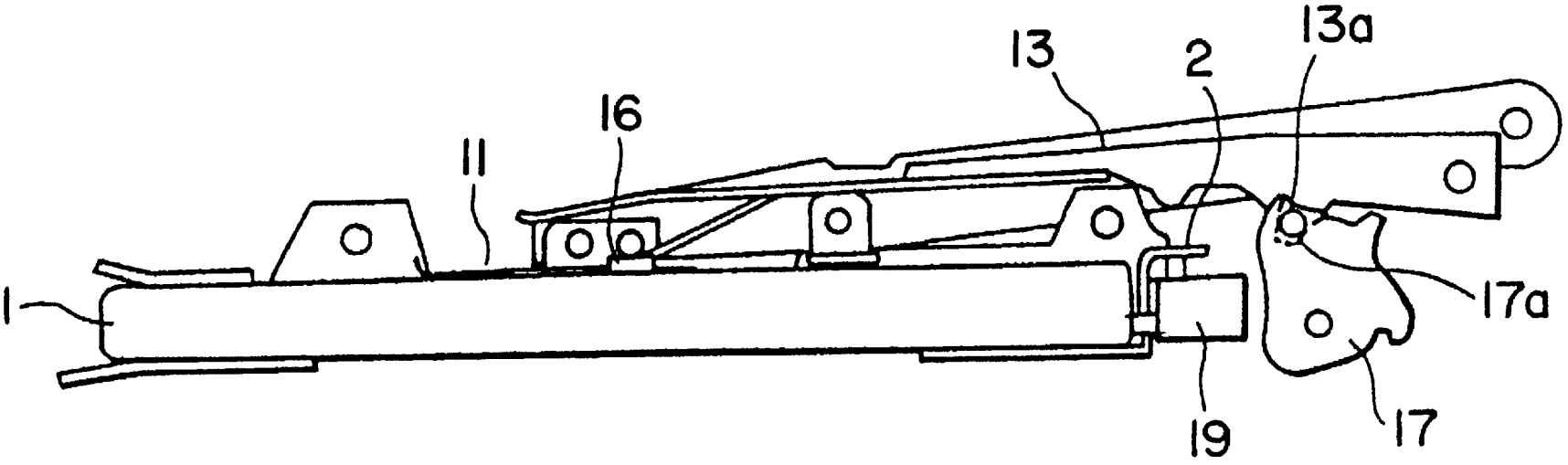
FIG. 9 is a side view explaining the operation of the mini-disc record/reproduction apparatus of the third embodiment.

FIG. 9 shows the state where the holder 2 further lowers from the state shown in FIGS. 7A and 7B. The plate spring 11 lowers by a distance greater than the motion span of the holder 2 to press the cartridge 1 against the positioning member, so that the inner circumferential area of the disc is attracted by the magnetic force generated by the turntable 8 and the disc is rotated by the turntable 8.

At this time, the projection 13a of the magnetic head arm 13 enters the recess 17a of the discrimination cam 17, so that the magnetic head arm 13 rotates in the counter-clockwise direction greater than that shown in FIG. 8, pressing the magnetic head 16 against the mini-disc. In addition, the discrimination cam 17 is rotated by the projection 13a in the direction of moving away from the discrimination lever 19.

Even after the projection 13a reaches the bottom of the recess 17a of the discrimination cam 17 and the magnetic head arm 13 stops, the holder 2 continues to lower and move remoter from the magnetic head arm 13. In this way, the components supported by the optical pickup transport 5 excepting the magnetic head 16 are physically separated from the other components, providing a smooth transport of the optical pickup 4.

Under this condition, a magnetic field modulated by a record signal is applied from the magnetic head 16 to the magnetic film of the disc heated by the laser spot from the optical pickup 4, to thereby record information.

In unloading the cartridge, the holder 2 is lifted and the optical pickup 4 is moved to the home position at the disc inner circumferential area. As the holder 2 is lifted, the discrimination cam 17 rotates in the counter-clockwise direction to the position shown in FIG. 5 by the spring force of the torsion coil spring 18. In the case of a cartridge accommodating a recordable min-disc, the discrimination lever 19 couples to the discrimination cam 17. In this case, the surface of the discrimination lever 19 facing the discrimination cam 17 is formed so smooth that the discrimination cam 17 is pushed by the discrimination lever 19 and rotates against the spring force of the torsion coil spring 18 in the direction of retracting from the discrimination lever 19, without restricting the motion of the optical pickup transport 5.

Figure 10:
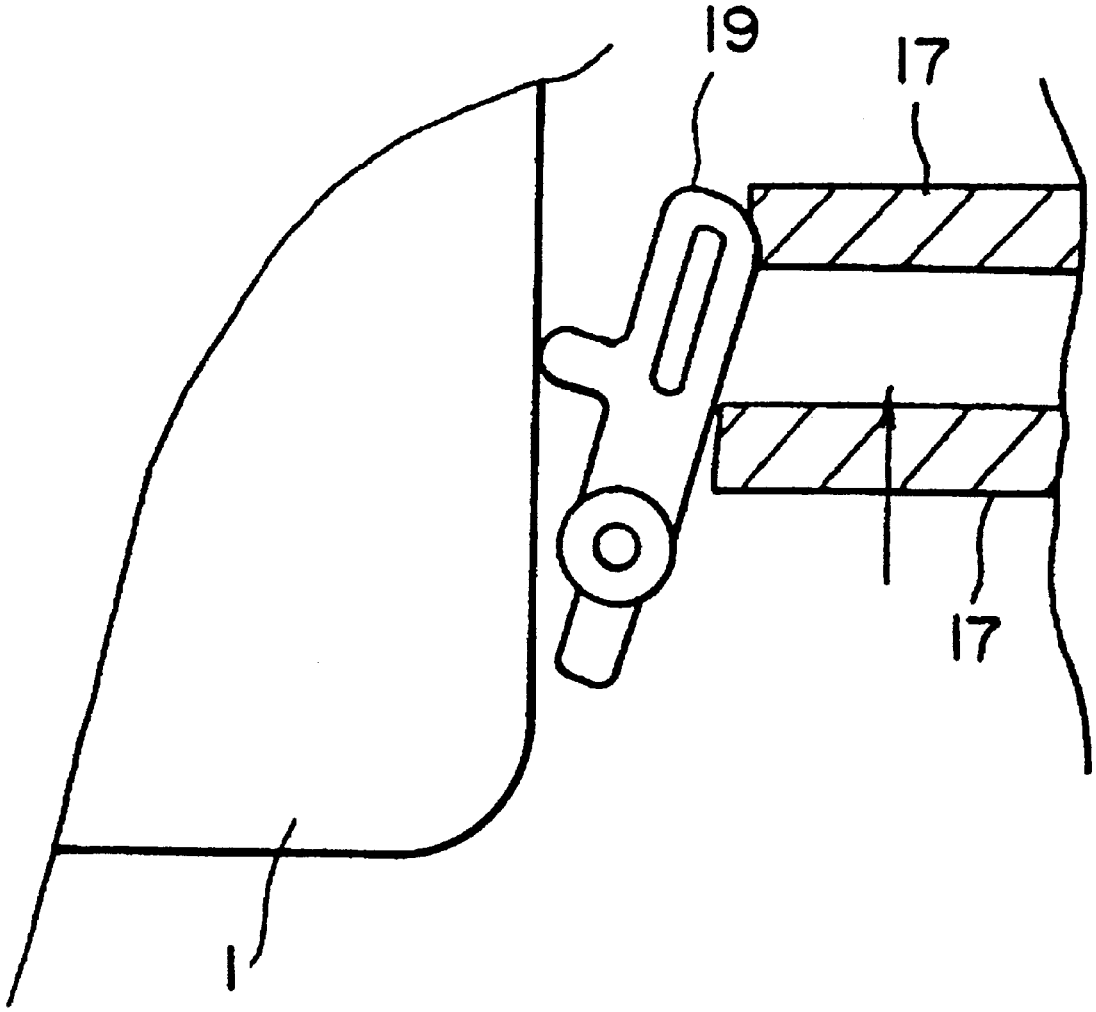
FIG. 10 is a side view explaining the operation of the mini-disc record/reproduction apparatus of the third embodiment.

This state is illustrated in FIG. 10. The optical pickup wherever it is placed at the unloading operation, can be moved at once thereby providing a quick unloading operation.

According to the photomagnetic disc record/reproduction apparatus of this invention, the member for clamping a photomagnetic disc is supported by the floating chassis. Accordingly, the record/reproduction unit can be completely isolated from the main frame chassis during the record/reproduction operation, providing a good vibration-proof.

Furthermore, the components supported by the optical pickup support can be placed remotely from other components during the record/reproduction operation. Accordingly, there occurs no contact or slide of a component during the motion of the optical pickup, eliminating the adverse effects such as vibration generation.

Still further, the surface of the discrimination lever facing the discrimination cam is formed so smooth that the discrimination cam when coupling to the discrimination lever is pushed by the discrimination lever and rotates against the spring force of the torsion coil spring in the direction of retracting from the discrimination lever, thereby not restricting the loading operation. The optical pickup wherever it is placed at the unloading operation, can be moved at once thereby providing a quick unloading operation.

What is claimed is:

1. A photomagnetic disc record/reproduction apparatus including a disc loading mechanism for mounting on a turntable a photomagnetic disc accommodated in a cartridge, an optical pickup for applying a laser spot to a signal record track of said disc, and a magnetic head for applying a magnetic field to the back surface of said disc where said laser spot is applied, characterized by a magnetic head lifting mechanism for making said magnetic head contact said disc or separate from said disc, said magnetic head lifting mechanism being connected to said disc loading mechanism and operated by a drive source provided to said disc loading mechanism, and a detector means for discriminating an outer shape of the cartridge of said mounted disc to detect whether said mounted disc is allowed to record data,

[at least one cam which connects] *means for connecting* said disc loading mechanism and said magnetic head lifting mechanism, wherein said magnetic head lifting mechanism responds to both the detection result obtained by said detector means and record/reproduction mode information to operate said magnetic head so that said magnetic head is brought into contact with said disc [only] when said mounted disc is allowed to record data and a record mode is set, and wherein said [at least one cam] *means for connecting* is adapted to take three positions to provide a first state where said disc is spaced apart from said turntable, a second state where said disc is mounted on said turntable and said magnetic head is spaced apart from said disc, and a third state where said disc is mounted on said turntable and said magnetic head is made in contact with said disc, so that it is allowed to move to said third state when said mounted disc is allowed to record data and a record mode is set.

2. The photomagnetic disc record/reproduction apparatus of claim 1 wherein said optical pickup moves in a direction approximately perpendicular to the direction that said photomagnetic disc accommodated in a cartridge is inserted into said apparatus.

3. A photomagnetic disc record/reproduction apparatus including a disc loading mechanism for mounting on a turntable a photomagnetic disc accommodated in a cartridge, an optical pickup for applying a laser spot to a signal record track of said disc, and a magnetic head for applying a magnetic field to the back surface of said disc where said laser spot is applied, characterized by a magnetic head lifting mechanism for making said magnetic head contact said disc or separate from said disc, said magnetic head lifting mechanism being connected to said disc loading mechanism and operated by a drive source provided to said disc loading mechanism, and a detector means for discriminating an outer shape of the cartridge of said mounted disc to detect whether said mounted disc is allowed to record data,

[a common cam which connects] *means for commonly connecting* said disc loading mechanism and said magnetic head lifting mechanism, wherein said magnetic head lifting mechanism responds to both the detection result obtained by said detector means and record/reproduction mode information to operate said magnetic head so that said magnetic head is brought into contact with said disc [only] when said mounted disc is allowed to record data and a record mode is set, and wherein said [common cam] *means for commonly connecting* is adapted to take three positions to provide a first state where said disc is spaced apart from said turntable, a second state where said disc is mounted on said turntable and said magnetic head is spaced apart from said disc, and a third state where said disc is mounted on said turntable and said magnetic head is made in contact with said disc, so that it is allowed to move to said third state when said mounted disc is allowed to record data and a record mode is set.

4. The photomagnetic disc record/reproduction apparatus of claim 3 wherein said optical pickup moves in a direction approximately perpendicular to the direction that said photomagnetic disc accommodated in a cartridge is inserted into said apparatus.

*5. The photomagnetic disc record/reproduction apparatus of claim 1, wherein said means for connecting comprises a cam.*

*6. The photomagnetic disc record/reproduction apparatus of claim 3, wherein said means for commonly connecting comprises a cam.*

*7. The photomagnetic disc record/reproduction apparatus of claim 5, wherein said cam comprises a slider and cam gooves.*

*8. The photomaonetic disc record/reproduction apparatus of claim 6, wherein said cam comprises a slider and cam grooves.*

*9. A method of mountino a photomagnetic disc accommodated in a cartridge on a turntable of a photomagnetic disc record/reproduction apparatus, and applying a magnetic field to the back surface of said disc, comprising the steps of:*

*holding said disc with a holder,*

*detecting whether said disc is allowed to record data,*

*moving back and forth a slider to lift and lower said holder,*

*attracting said disc on a turntable when said holder is at a lowered position, and*

*if said disc is allowed to record data. recording data by moving said slider further backward to press a magnetic head against said disc.*

*10. A method of mounting a photomagnetic disc accommodated in a cartridge on a turntable of a photomaongetic disc record/reproduction apparatus by a disc loading mechanism and applying magnetic field of a magnetic head to the back surface of said disc by a magnetic head lifting mechanism, comprising the steps of:*

*holding said disc with said disc loading mechanism, said disc loading mechanism including a holder,*

*moving at least one of back and forth a slider operably connected to said disc loading mechanism and marnetic head lifting mechanism to lower said holder by actuating a drive mechanism,*

*detecting whether said disc is allowed to record data, and*

*if said disc is allowed to record data, recording data by moving said slider further backward to press said magnetic head against said disc by actuating said magnetic head lifting mechanism.*

*11. The photmagnetic disc record/reproduction apparatus of claim 1, wherein said magnetic head is spaced in a predetermined position apart from said disc at the first and second states.*

*12. The photomagnetic disc record/reproduction apparatus of claim 3, wherein said magnetic head is spaced in a predetermined position apart from said disc at the first and second states.*

*13. The method of claim 9, wherein said holder is lifted and lowered without moving said magnetic head.*

*14. The method of claim 10, wherein said holder is lowered without moving said magnetic head lifting mechanism.*

* * * * *